Jan. 18, 1955
M. H. SHAMOS
2,700,108
GAMMA RAY SURVEY METER
Filed Oct. 18, 1952
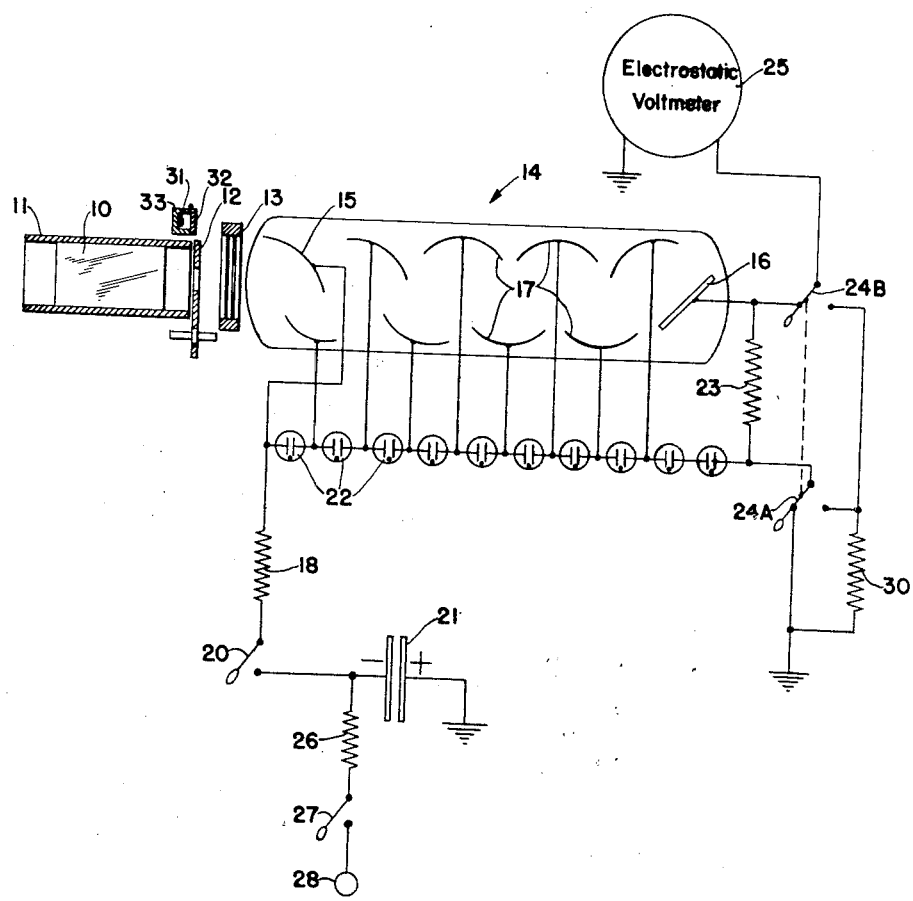
MORRIS H. SHAMOS
*INVENTOR.*
BY *Ralph E. Bitner*
ATTORNEY

United States Patent Office 2,700,108
Patented Jan. 18, 1955

2,700,108

GAMMA RAY SURVEY METER

Morris H. Shamos, New York, N. Y., assignor to Chatham Electronics Corporation, a corporation of New Jersey Application October 18, 1952, Serial No. 315,546

4 Claims. (Cl. 250—71)

This invention relates to portable gamma survey meters and has particular reference to a portable, lightweight, direct reading instrument which covers the range between ten milliroentgen per hour to five hundred roentgen per hour.

Many types of survey meters have been developed, but most of them were laboratory instruments or cumbersome, portable meters designed along the lines of the laboratory instruments. All the prior art meters required a considerable power plant and used high voltages and currents ranging in magnitude from ten milli-amperes to much larger values.

The present invention requires no batteries nor other form of electrical generator during the operating period, and while the voltage required is 700 volts, the current is so low that very little power is consumed. A charged capacitor is used to provide the electrical power necessary, and this capacitor may be charged many times; therefore, the instrument requires no replaceable item.

One of the objects of this invention is to provide an improved gamma survey meter which avoids one or more of the disadvantages and limitations of prior art arrangements.

Another object of the invention is to provide a lightweight portable meter which does not require batteries.

Another object of the invention is to provide a meter that is direct reading in roentgens per hour.

Another object of the invention is to reduce the cost of portable survey meters while still retaining considerable accuracy.

Another object of the invention is to provide a test means for indicating the amount of charge on the capacitor and for checking the calibration.

The invention includes an organic scintillator such as anthracene, stilbene, or other phosphorescent substance used in combination with a photo-multiplier tube, the output of which is connected to an electrostatic voltmeter. The multiplier tube is connected to a charged capacitor and a plurality of neon lamps are connected in series to provide equal steps in voltage between the plates. Switching means is provided for charging the capacitor and for connecting the capacitor to the photo-multiplier tube when a reading is to be taken. A small light source is used for checking the calibration.

For a better understanding of the present invention, together with other and further objects thereof, reference is made to the following description taken in connection with the accompanying drawing.

The figure is a schematic diagram of connections showing the scintillator crystal, photo-multiplier tube, and the electrostatic voltmeter.

A crystal 10 which may be stilbene or some similar substance, is mounted within a metallic cylinder 11. One end of this cylinder is exposed to gamma radiation. The other end of the cylinder is masked by a rotatable diaphragm plate 12 which contains a number of holes of variable size to extend the range of the instrument. An iris diaphragm 13 is also mounted in close proximity to the diaphragm plate 12 to form a means of changing the calibration of the device. A photo-multiplier tube 14 is mounted close to the iris diaphragm so that the light, which is generated in the crystal by the gamma rays, can shine through both diaphragms and strike a photo cathode 15. The photo-multiplier tube includes an anode 16 at the other end of the envelope and a series of secondary emissive electrodes 17 for generating secondary electrons. The cathode 15 is connected to a high resistor 18, a switch 20, and one side of a chargeable capacitor 21, the other side of the capacitor being connected to ground. The cathode 15 is also connected to one terminal of a neon tube 22, which is in series with nine other similar neon tubes to provide a series of equal voltage steps for the secondary electrodes 17.

The anode 16 is connected through a resistor 23 to the other terminal of the neon lamp series and is also connected through a switch arm 24A to ground. An electrostatic voltmeter 25, which may have a range of 150 volts full scale, is connected between ground and a switch arm 24B, which in the operating condition connects the electrostatic voltmeter to the anode 16 and therefore measures the voltage drop across resistor 23.

A charging circuit is provided for placing an electrical charge on capacitor 21. This circuit includes the capacitor, a resistor 26, a switch 27, and a terminal 28.

A test circuit is arranged to measure the current through the neon lamps in order to determine whether the capacitor has retained enough of its charge to operate the photo-multiplier tube in a satisfactory manner. This circuit includes the voltmeter 25, switch arms 24A and 24B when moved to the right hand terminal, and a resistor 30. When this circuit is in operation, the voltmeter measures the voltage drop across resistor 30, and therefore the reading is proportional to the current through the lamps.

Another test means is employed to test the operating qualities of the circuit and the capacitor. A small box 31, having a removable cover, is positioned close to cylinder 11 and contains a small quantity of fluorescent material 33. This material is used as a standard source of light, and when the cover 32 is opened, light from material 33 shines on the cathode 15 and produces a reading on the voltmeter which should be within a narrow range of values to indicate that the circuit is functioning properly. The iris diaphragm 13 may be adjusted during this operation to set the voltmeter to a predetermined value, thereby calibrating the instrument exactly.

The operation of this device is as follows: With switch 20 open and switch 27 closed, terminal 28 is connected to a source of electrical power and charged to a voltage of about 1700 volts. Then switch 27 is opened, and a test reading is taken with switch arms 24A and B on the right hand terminal to determine whether the proper current is passing through neon lamps 22. Then a second test may be made by lifting the cover 32, exposing the fluorescent material to the photo-multiplier tube and with switch arms 24A and B on the left, noting the reading of voltmeter 25.

To take a reading to determine the intensity of gamma radiation, cylinder 11 is aimed at the suspected source, switch 20 is closed, and the reading on voltmeter 25 is noted. In order to conserve the charge on capacitor 21, switch 20 should be closed only when a reading is being taken or when the above described tests are being made.

Tests have disclosed that a capacitor of about .1 microfarads charged to a potential of 1700 volts will produce a steady current of $5 \times 10^{-8}$ amperes, thereby producing a voltage drop of 70 volts across each neon lamp. The iris diaphragm may be replaced by a neutral wedge if desired. It has been found that a photo-multiplier tube of the type 931A or 1P21 can be used in this circuit with satisfactory results.

While there have been described and illustrated specific embodiments of the invention, it will be obvious that various changes and modifications may be made therein without departing from the field of the invention which should be limited only by the scope of the appended claims.

I claim:

1. A gamma ray survey meter for determining the intensity of gamma radiation comprising; a crystal scintillator for transforming gamma rays into light; a photo-multiplier discharge device for converting light rays into electric current; said discharge device including a photo-cathode, a plurality of intermediate secondary emissive electrodes, and an anode; a capacitor having circuit means for first connecting to an external source of electric power and then connecting to the anode-cathode circuit of the discharge device; each of said secondary electrodes connected to one of a plurality of gas filled diodes connected in series with a resistor and the plates of the capacitor; and an electrostatic voltmeter connected across a resistor in the anode-cathode circuit for indicating a current value.

2. A gamma ray survey meter for determining the intensity of gamma radiation comprising; a crystal scintillator for transforming gamma rays into light; a photo-multiplier discharge device for converting light rays into electric current; said discharge device including a photo-cathode, a plurality of intermediate secondary emissive electrodes, and an anode; a capacitor having circuit means for first connecting to an external source of electric power and then connecting to the anode-cathode circuit of the discharge device; each of said secondary electrodes connected to one of a plurality of gas filled diodes connected in series with a resistor and the plates of the capacitor; and an electrostatic voltmeter connected across a resistor in series with the anode in the photo-multiplier discharge device for indicating a current value which is directly proportional to the incident gamma radiation on the scintillating crystal.

3. A gamma ray survey meter for determining the intensity of gamma radiation comprising; a crystal scintillator for transforming gamma rays into light; a photo-multiplier discharge device for converting light rays into electric current; said discharge device including a photo-cathode, a plurality of intermediate secondary emissive electrodes, and an anode; a capacitor having circuit means for first connecting to an external source of electric power and then connecting to the anode-cathode circuit of the discharge device; each of said secondary electrodes connected to one of a plurality of gas filled diodes connected in series with a resistor and the plates of a capacitor; said diodes acting as a voltage divider and voltage regulator for the electric power furnished by the capacitor; and an electrostatic voltmeter connected across a resistor in series with the anode in the photo-multiplier discharge device for indicating a current value which is directly proportional to the incident gamma radiation on the scintillating crystal.

4. A gamma ray survey meter for determining the intensity of gamma radiation comprising; a crystal scintillator for transforming gamma rays into light; a photo-multiplier discharge device for converting light rays into electric current; said discharge device including a photo-cathode, a plurality of intermediate secondary emissive electrodes, and an anode; a capacitor having circuit means for first connecting to an external source of electric power and then connecting to the anode-cathode circuit of the discharge device; an electrostatic voltmeter connected across a resistor in the anode-cathode circuit for indicating a current value; and an auxiliary source of light having an unchanging light emitting characteristic for applying light rays to said photo-multiplier to test the calibration of the meter.

References Cited in the file of this patent

UNITED STATES PATENTS

| | | |
|---|---|---|
| 2,407,564 | Martin et al. | Sept. 10, 1946 |
| 2,541,187 | Ball et al. | Feb. 13, 1951 |
| 2,615,079 | Pardue et al. | Oct. 21, 1952 |
| 2,625,653 | Wouters | Jan. 13, 1953 |
| 2,676,270 | Lahti | Apr. 20, 1954 |